United States Patent
Sumida et al.

[11] Patent Number: 5,954,343
[45] Date of Patent: Sep. 21, 1999

[54] SEAL RING

[75] Inventors: Mamoru Sumida; Norihisa Fukutomi, both of Tokyo, Japan

[73] Assignee: Mitsubishi Denki Kabushika Kaisha, Tokyo, Japan

[21] Appl. No.: 08/919,781

[22] Filed: Aug. 29, 1997

[51] Int. Cl.$^6$ .............................. F16J 15/36; F16J 15/54
[52] U.S. Cl. ............................................................ 277/434
[58] Field of Search ................................... 277/434, 435, 277/436; 73/119 R, 120

[56] References Cited

U.S. PATENT DOCUMENTS 4,580,796  4/1986  Bronson ................................. 277/199
5,544,897  8/1996  Di Pietro et al. ..................... 277/81 R

FOREIGN PATENT DOCUMENTS 7-30368  6/1995  Japan .

Primary Examiner—William Oen

[57] ABSTRACT

A seal ring to be disposed between two surfaces to sealingly isolate a clearance therebetween into radially inner and outer portions, the seal ring (45) comprisinig a first ridge portion (51) extending through the entire circumference on the first side (46) for sealingly contacting the first surface at a first radial position, and a second ridge portion (52) extending through the entire circumference on the second side for sealingly contacting the second surface at a second radial position different from the first radial position. The seal ring may a generally wave-shaped or S-shaped cross section or include a soft material layer on its surface. The seal ring (65) may also comprise a projection (62) extending from the inner circumference surface of the seal ring in substantially radially inner direction for elastically engaging with a member disposed in the innter circumferential portion of the seal ring.

6 Claims, 3 Drawing Sheets

SEAL RING

BACKGROUND OF THE INVENTION

This invention relates to a seal ring and more particularly to a seal ring exhibiting a good sealing performance with respect to a metallic surface even under high load and high temperature conditions.

The seal rings maintaining a good sealing performance with respect to a metallic surface even under high load and high temperature conditions are useful in many different technical fields. Such seal rings are particularly suitable for use, for example, with the cylinder direct injecting fuel injection valve mounted to cylinder for injecting fuel directly into cylinders.

The cylinder direct injecting fuel injection valve mounted to the cylinder of an internal combustion engine must endure severe environmental conditions peculiar to the fuel direct injection. The performances required under these conditions include the mechanical strength resisting to the cylinder heat and vibration and the mechanical strength resisting to the high pressure and high temperature of the burning gas within the combustion chamber as well as the sealing performance for preventing the leaks of the fuel and burning gas, the required electric and magnetic characteristics and resistance to the chemical components or residual components of the fuel and burning gas.

Such the cylinder direct injection fuel valve has a general structure in which a hollow injection valve main body containing a needle valve therein is connected by pressure-fit or the like to a housing, within which a solenoid for actuating the needle valve is disposed. The mounting of the injection valve to the cylinder is usually achieved by inserting an injection valve main body into an opening in the cylinder head and the housing of the injection valve is urged under pressure against the cylinder head by a fuel supply pipe.

One example of such cylinder direct injection fuel valve is disclosed in Japanese U.M. Laid-Open No. 7-30368, which employs a complex structure of a specially shaped gasket as well as an O-ring together in order to ensure the seal between the cylinder head and the cylinder direct injecting fuel injection valve urged against it.

However, even with such the complex sealing structure, it was difficult to maintain the seal between the cylinder direct injecting fuel injection valve and the cylinder head with a high reliability for an extended period of time because of high temperature of the cylinder head and high pressure within the combustion chamber. Under these circumstances, it is desirable to develop a highly reliable new seal ring even under high-temperature and high-pressure conditions and yet simple in structure and inexpensive.

SUMMARY OF THE INVENTION

Accordingly, one object of the present invention is to provide a seal ring exhibiting a high sealing performance with a high reliability even under the conditions of high temperature and high pressure as in the cylinder direct injecting fuel injection valve.

Another object of the present invention is to provide a seal ring particularly suitable for use with a cylinder direct injecting fuel injection valve and simple in structure and easy to manufacture and yet is durable even under hostile environmental conditions and maintains high reliability and high performance for an extended period of time.

With the above objects in view, the present invention resides in a seal ring having a first side and a second side, the seal ring being to be disposed between a first surface and a second surface opposing to each other with a clearance therebetween so that the first side abuts against the first surface and the second side abuts against the second surface to sealingly isolate the clearance into a radially inner portion and a radially outer portion. The seal ring comprises a first ridge portion extending through the entire circumference on the first side for sealingly contacting the first surface at a first radial position, and a second ridge portion extending through the entire circumference on the second side for sealingly contacting the second surface at a second radial position different from the first radial position.

The seal ring may comprise an elastic ring main body of a substantially frustoconical dish spring shape, the first ridge portion having an arcuate cross section integrally extending from an outer circumference edge of the ring main body and convex toward an axially outer side, the second ridge portion having an arcuated cross section integrally extending from an inner circumference edge of the ring main body and convex toward an axially outer side.

The ring main body, the first ridge portion and the second ridge portion together may exhibit a generally wave-shaped cross section or a generally S-shaped cross section.

The seal ring may comprise a layer of a soft material on its surface.

The seal ring may comprise a projection extending from the inner circumference surface of the seal ring in substantially radially inner direction for elastically engaging with a member disposed in the innter circumferential portion of the seal ring.

BRIEF DESCRIPTION OF THE DRAWINGS

The present invention will become more readily apparent from the following detailed description of the preferred embodiment of the present invention taken in conjunction with the accompanying drawings, in which.

DESCRIPTION OF THE PREFERRED EMBODIMENTS

Figure 1:
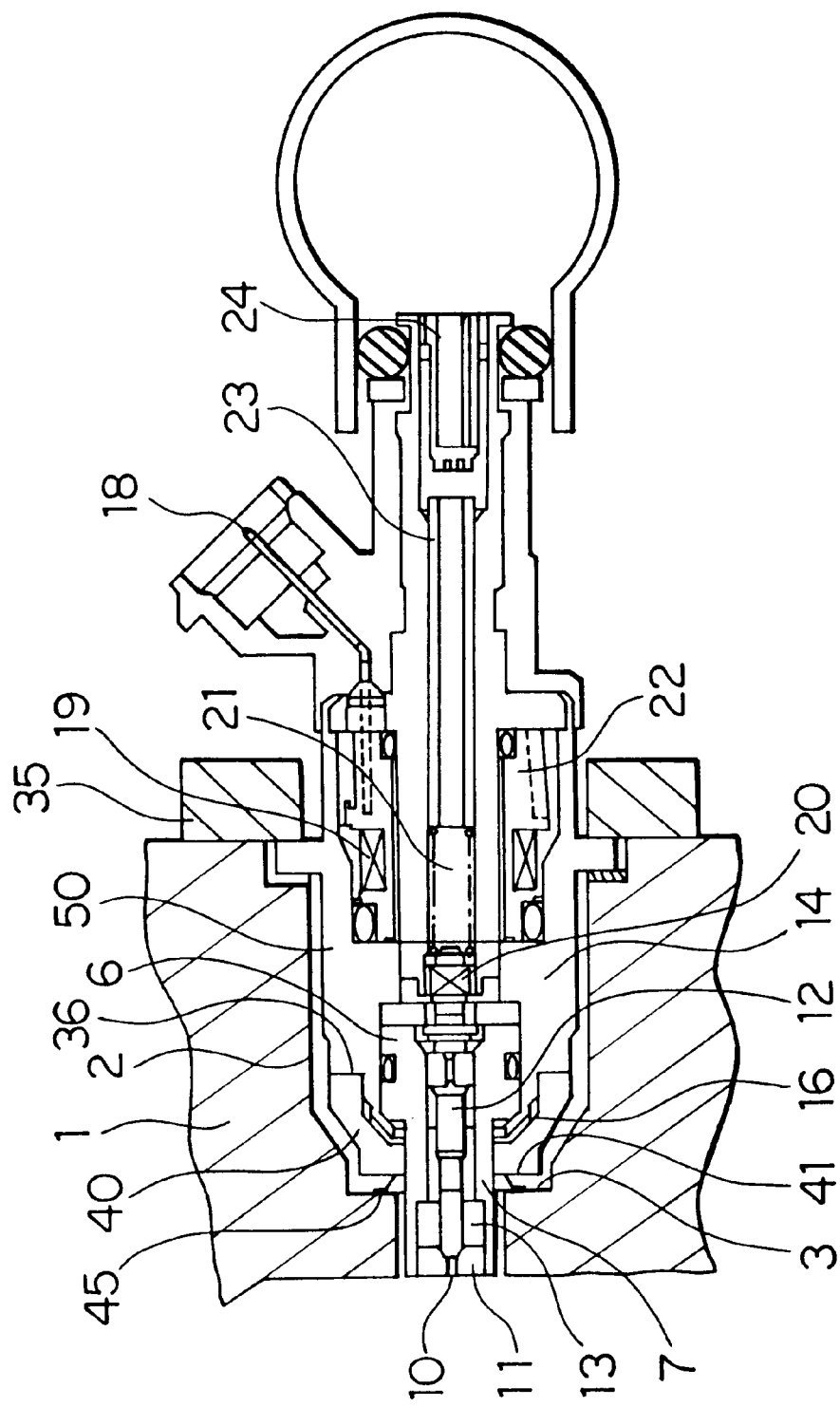
FIG. 1 is a sectional view showing the state in which the seal ring of the present invention is used in mounting a cylinder direct injecting fuel injection valve to a cylinder head.

FIG. 1 illustrates one example of the mounting of a cylinder direct injecting fuel injection valve 50 to a cylinder head 1 of an internal combustion engine through the use of a seal ring 45 of the present invention. When the cylinder direct injecting fuel injection valve 50 is mounted as shown in FIG. 1, a fuel injection nozzle 10 of a valve assembly 6 opens to a combustion chamber, and the seal ring 45 of the present invention is inserted in a compressed state between a shoulder portion 3 of the injectin valve insertion bore 2 which is a first surface to be sealed by the seal ring 45 and a first end surface 41 of a sleeve 40 which is a second surface.

Figure 2:
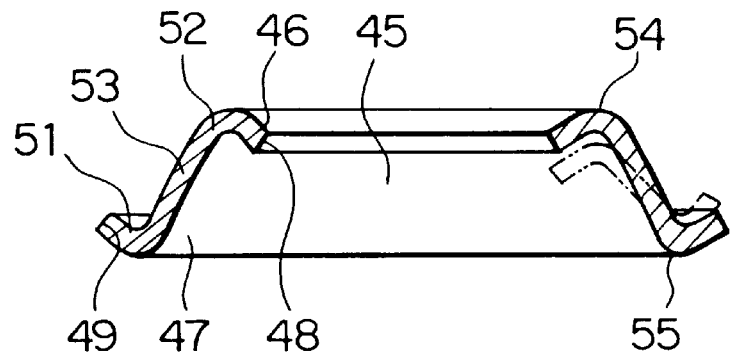
FIG. 2 is a sectional side view of the seal ring of the present invention.
Figure 3:
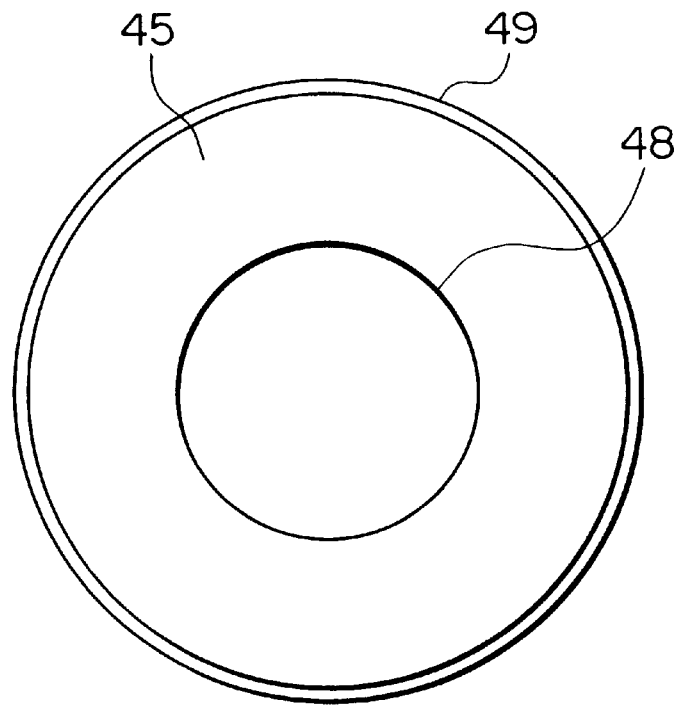
FIG. 3 is a plan view of the seal ring shown in FIG. 2.

As seen from FIGS. 2 and 3, the seal ring 45 is a substantially ring-shaped member punched out from an iron or a steel plate coated with a soft material such as plated tin or the like and pressed to provide an annular ridge portions so as to exhibit a generally wave-shaped or substantially dull S-shaped cross-sectional configuration. The seal ring 45 as a whole comprises a first side 46 and a second side 47 spaced apart from each other in the axial direction and an inner circumference edge 48 and an outer circumference edge 49 spaced apart from each other in the radial direction. The seal ring 45 has a substantially wave-shaped cross section and comprises a first ridge portion 51 extending in arcuated shape from the outer circumference edge 49 toward the inner circumference edge 48, a second ridge portion 52 extending in arcuated shape in the direction opposite to the first ridge portion 51 from the inner circumference ridge 48 toward the outer circumference edge 49, and a tapered main body portion 53 connected between the first ridge portion 51 and the second ridge portion 52. The first and the second ridge portions 51 and 52 each is an annular member of an arcuated cross section.

When the cylinder direct injecting fuel injection valve 50 is inserted into the injection valve insertion bore 2 in the cylinder head 1 as shown in FIG. 1, the seal ring 45 is engaged at its inner circumference edge 48 to an outer circumferential surface of the small-diameter cylindrical portion 7 of the valve assembly 6 of the cylinder direct injection fuel injection valve 50. The first side 46 which is an outer surface of the convex of the first ridge portion 51 of the seal ring 45 is in abutment at a linear sealing contact portion 54 with the first end face 41 or the tip end of the sleeve 40 of the cylinder direct injection fuel injection valve 50, and the second side 47 which is an outer surface of the convex of the second ridge portion 52 is in abutment at a linear sealing contact portion 55 with the shoulder portion 3 of the injection valve insertion bore 2 of the cylinder head 1.

Therefore, when the cylinder direct injection fuel injection valve 50 is subjected to a certain force and a clearance defined between the first end surface 41 of the sleeve 40 contacting with the seal ring 45 and the shoulder portion 3 of the injection valve insertion bore 2 is decreased, the seal ring 45 deforms to shrink in the axial direction as shown in phantom lines in the figure, but the amount of deformations of the first ridge portion 51 and the second ridge portion 52 is small. Therefore, each of the sealing contact line portion 54 between the second ridge portion 52 of the seal ring 45 and the first end surface 41 of the sleeve 40 as well as the sealing contact line portion 55 between the first ridge portion 51 and the shoulder portion 3 moves along the respective ridge portions 51 and 52 just like the ridge portions roll on the abutting surfaces, providing no substantial change in sealing performance even when the seal ring 45 is deformed and the seal ring 45 returns to its original state when the load is removed.

The fuel from the fuel tank (not shown) pressurized by a pressurizing pump (not shown) and supplied through the fuel supply pipe 5 to the cylinder direct injecting fuel injection valve of the present invention flows through a filter 24, a spacer pipe 23 and a spring 21 and around the armature 20 of the solenoid assembly 22 to reach to the valve assembly 6. The fuel reached to the valve assembly 6 is not injected from the vavle assembly 6 when the needle valve 12 is positioned by the spring 21 in the closed position shown in FIG. 1 because the injection nozzle 10 is closed.

When solenoid assembly 22 is energized by a power source (not shown) connected to a connector 18, the coil 19 generates magnetic fluxes in a magnetic circuit aroud the coil 19 including the housing 14, the armature 20 and the like to attract the armature 20 together with the needle valve 12 connected to the armature 20 to move them in the right in FIG. 1 against the spring action of the spring 21. When the needle valve 12 thus receeds from the valve seat 11, the fuel within the valve assembly 6 is injected into the combustion chamber of the internal combustion engine from the fuel injection nozzle 10 after a swirling motion is given by a swirler 13.

The seal between the cylinder head 1 and the cylinder direct injecting fuel injection valve is establishd at a portion relatively close to the tip of the cylinder direct injecting fuel injection valve by the seal ring 45 under pressure between the shoulder portion 3 of the injecton valve insertion bore 2 in the cylinder head 1 and the first end surface 41 of the sleeve 40, so that the force pressing the seal is not transmitted to the joint portion 16 of the housing 14, but is directly transmitted to the abutting surface 36 of the housing 14 through the sleeve 40 and received by the cylinder head 1 through a fork member 35.

The surface of the seal ring 45 has a plated layer of a relatively soft metal such as tin, so that the soft layer fit well with a relatively small urging force with respect to the metal first end surface 41 of the sleeve 40 which is the first surface to be sealed as well as to the metal surface of the shoulder portion 3 of the injection valve insertion bore 2 which is the second surface, whereby an intimate, effective seal surfaces can be established between the metal surfaces. The material that can be used for this purpose includes, in addition to tin, soft metals such as zinc, copper and silver and Teflon (Tradename) or the like. The thickness of the soft metal layer may be from 15 $\mu$m to 30 $\mu$m.

Figure 4:
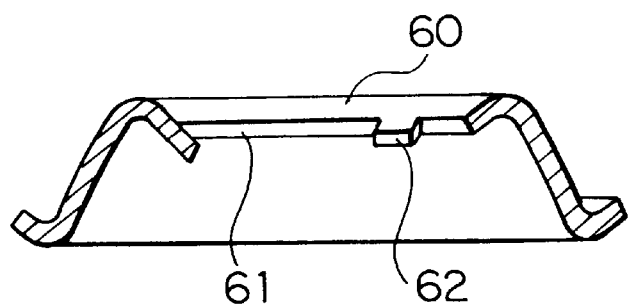
FIG. 4 is a sectional view showing another embodiment of the seal ring of the present invention.
Figure 5:
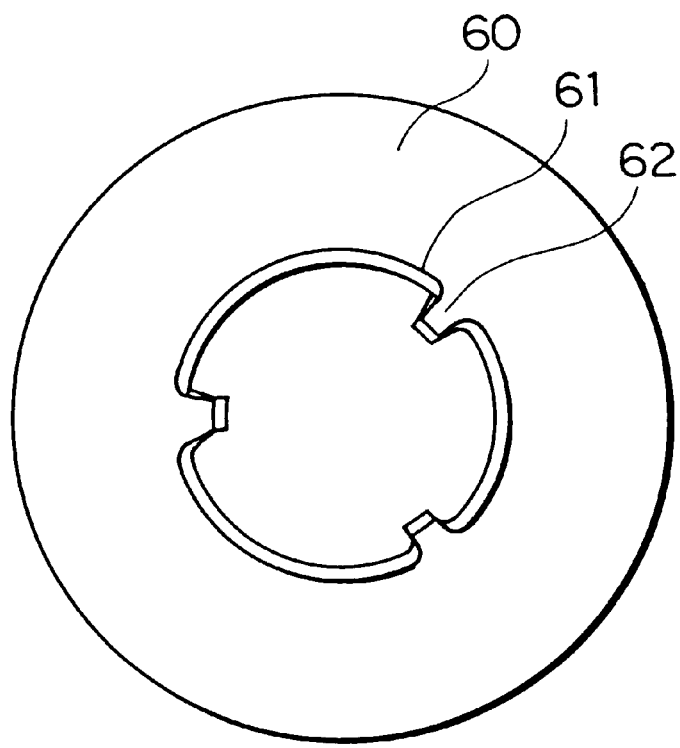
FIG. 5 is a bottom view of the seal ring shown in FIG. 4.

FIGS. 4 and 5 illustrate a seal ring 60 of another embodiment of the present invention. The seal ring 60 comprises projections 62 extending from the inner circumference edge 61 of the seal ring 60 in substantially radially inner direction. While it is desirable that three projections 62 are disposed at circumferentially equal intervals as shown, the projection may equally be only one, two or four or more than four. The projections 62 may preferably be arranged to elastically engage with a small force with the outer circumferential surface when the seal ring 60 is placed around the small-diameter cylindrical portion 7 of the valve assembly 6, the arrangement may also be such that only a slight catch, scratch or friction generates between the tips of the projections 62 and the outer surface of the cylindrical portion 7. The provision of such the projections 62 can prevent the seal ring 60, owing to the elastic engagement or engagement of the projections 62, from slipping and falling off from the valve assembly 6 by the gravity while the cylinder direct injection fuel injection valve 50 is being assembled or mounted to the cylinder head 1.

Figure 6:
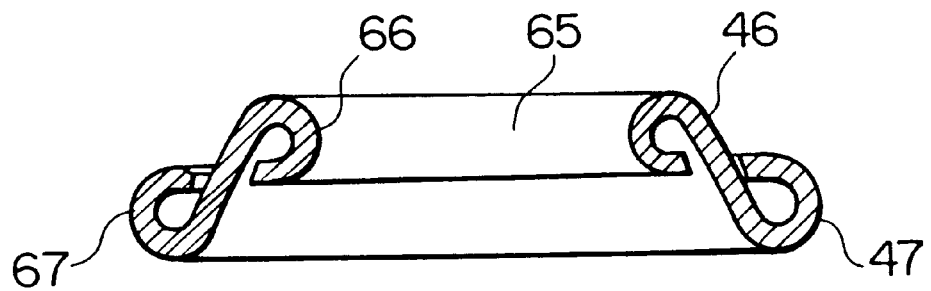
FIG. 6 is a sectional view showing a still another embodiment of the seal ring of the present invention.

FIG. 6 illustrates still another seal ring 65 which has a general cross section of a substantially "S", which is advantageous when the it is desired to provide the seal ring 65 a small spring constant and a high rigidity. The arcuate ridge portion is provided not only at the side portion of the seal ring 65 but also at an inner circumferential edge 66 and an outer circumference edge 67, the seal can be established at these portions if desired.

What is claimed is:

1. A seal ring having a first side and a second side, said seal ring being to be disposed between a first surface and a second surface opposing to each other with a clearance therebetween so that said first side abuts against the first surface and said second side abuts against the second surface to sealingly isolate the clearance into a radially inner portion and a radially outer portion, said seal ring comprisinig:

a first ridge portion extending through the entire circumference on said first side for sealingly contacting the first surface at a first radial position; and a second ridge portion extending through the entire circumference on said second side for sealingly contacting the second surface at a second radial position different from said first radial position.

2. A seal ring as claimed in claim 1 wherein said seal ring comprises an elastic ring main body of a substantially frustoconical dish spring shape, said first ridge portion having an arcuated cross section integrally extending from an outer circumference edge of said ring main body and convex toward an axially outer side, said second ridge portion having an arcuated cross section integrally extending from an inner circumference edge of said ring main body and convex toward an axially outer side.

3. A seal ring as claimed in claim 1 wherein said ring main body, said first ridge portion and said second ridge portion together exhibit a generally wave-shaped cross section.

4. A seal ring as claimed in claim 1 wherein said ring main body, said first ridge portion and said second ridge portion together exhibit a generally S-shaped cross section.

5. A seal ring as claimed in claim 1 wherein said seal ring comprises a layer of a soft material on its surface.

6. A seal ring as claimed in claim 1 wherein said seal ring comprises a projection extending from the inner circumference surface of said seal ring in substantially radially inner direction for elastically engaging with a member disposed in the innter circumferential portion of said seal ring.

* * * * *